United States Patent
Pal

(10) Patent No.: US 9,954,844 B2
(45) Date of Patent: *Apr. 24, 2018

(54) OFFLINE AUTHENTICATION

(71) Applicant: Red Hat, Inc., Raleigh, NC (US)

(72) Inventor: Dmitri V. Pal, Framingham, MA (US)

(73) Assignee: Red Hat, Inc., Raleigh, NC (US)

( * ) Notice: Subject to any disclaimer, the term of this patent is extended or adjusted under 35 U.S.C. 154(b) by 22 days.

This patent is subject to a terminal disclaimer.

(21) Appl. No.: 14/607,262

(22) Filed: Jan. 28, 2015

(65) Prior Publication Data

US 2015/0143498 A1    May 21, 2015

Related U.S. Application Data

(63) Continuation of application No. 13/422,903, filed on Mar. 16, 2012, now Pat. No. 8,955,086.

(51) Int. Cl.
*G06F 7/04* (2006.01)
*H04L 29/06* (2006.01)
*G06F 21/62* (2013.01)

(52) U.S. Cl.
CPC ...... *H04L 63/0807* (2013.01); *G06F 21/6218* (2013.01); *H04L 63/08* (2013.01); *H04L 63/102* (2013.01)

(58) Field of Classification Search
CPC ............ H04L 9/32; H04L 63/08; G06F 21/30
USPC .......................... 726/4–10; 380/282; 713/185
See application file for complete search history.

(56) References Cited

U.S. PATENT DOCUMENTS

| 7,506,368 B1* | 3/2009 | Kersey ................ H04L 63/0428 726/12 |
| 7,725,730 B2 | 5/2010 | Juels et al. |
| 7,890,997 B2* | 2/2011 | Walker ................ G06F 21/6218 380/278 |
| 7,958,543 B2 | 6/2011 | Samji et al. |

(Continued)

OTHER PUBLICATIONS

USPTO, Office Action for U.S. Appl. No. 13/422,903, dated Apr. 24, 2013.

(Continued)

*Primary Examiner* — Carl Colin
*Assistant Examiner* — Viral Lakhia
(74) *Attorney, Agent, or Firm* — Lowenstein Sandler LLP

(57) ABSTRACT

A method including determining, by a processing device, whether a computer system is able to access an authentication server, in response to determining that the computer system is able to access the authentication server, requesting a first set of credentials, authenticating the first set of credentials, assigning a user a first role for performing operations on the computer system in view of the first set of credentials, and in response to determining that the computer system is unable to access the authentication server, requesting a second set of credentials different from the first set of credentials, authenticating one or more credentials provided by the user, and assigning the user a second role for performing operations on the computer system in view of the one or more credentials, wherein the first role specifies a first type of access to at least one object on the computer system, and the second role specifies a second type of access to the at least one object, wherein the first type of access is different from the second type of access.

17 Claims, 8 Drawing Sheets

(56) References Cited

U.S. PATENT DOCUMENTS

| | | | |
|---|---|---|---|
| 8,201,256 B2 | 6/2012 | Patanella | |
| 8,214,398 B1* | 7/2012 | Cowan | G06F 21/6218 |
| | | | 707/785 |
| 8,271,395 B2 | 9/2012 | Dominguez et al. | |
| 8,333,321 B2 | 12/2012 | Gressel et al. | |
| 8,353,052 B2* | 1/2013 | Larsson | H04L 63/0807 |
| | | | 713/155 |
| 8,554,749 B2 | 10/2013 | Herbach | |
| 8,661,513 B2* | 2/2014 | Hochmuth | H04L 67/306 |
| | | | 715/733 |
| 8,689,294 B1* | 4/2014 | Thakur | H04L 63/08 |
| | | | 713/182 |
| 9,043,605 B1* | 5/2015 | Machani | G06F 21/35 |
| | | | 713/185 |
| 2003/0191946 A1 | 10/2003 | Auer et al. | |
| 2003/0200465 A1* | 10/2003 | Bhat | H04L 63/0815 |
| | | | 726/8 |
| 2006/0015725 A1 | 1/2006 | Voice et al. | |
| 2006/0080729 A1 | 4/2006 | Koh et al. | |
| 2006/0109839 A1* | 5/2006 | Hino | H04L 63/083 |
| | | | 370/352 |
| 2006/0184997 A1 | 8/2006 | La Rotonda et al. | |
| 2007/0079347 A1* | 4/2007 | Makise | H04N 7/1675 |
| | | | 725/115 |
| 2007/0180260 A1* | 8/2007 | Crescenzo | G06F 21/31 |
| | | | 713/183 |
| 2008/0072303 A1* | 3/2008 | Syed | H04L 63/0807 |
| | | | 726/10 |
| 2008/0097998 A1 | 4/2008 | Herbach | |
| 2008/0098464 A1* | 4/2008 | Mizrah | G06F 21/36 |
| | | | 726/5 |
| 2008/0184335 A1 | 7/2008 | Zhang et al. | |
| 2009/0022325 A1* | 1/2009 | Naedele | H04L 63/08 |
| | | | 380/282 |
| 2009/0052675 A1* | 2/2009 | Levow | G06F 21/33 |
| | | | 380/278 |
| 2011/0055585 A1 | 3/2011 | Lee | |
| 2011/0191858 A1 | 8/2011 | Shapiro et al. | |
| 2011/0219230 A1 | 9/2011 | Oberheide et al. | |
| 2011/0296013 A1* | 12/2011 | Saunders | H04L 67/10 |
| | | | 709/224 |
| 2012/0099725 A1* | 4/2012 | Sakazaki | G06F 21/73 |
| | | | 380/28 |
| 2012/0150888 A1 | 6/2012 | Hyatt et al. | |
| 2013/0067552 A1* | 3/2013 | Hawkes | H04L 63/166 |
| | | | 726/7 |
| 2013/0136255 A1 | 5/2013 | Brown | |

OTHER PUBLICATIONS

USPTO, Final Office Action for U.S. Appl. No. 13/422,903, dated Sep. 27, 2013.
USPTO, Notice of Allowance for U.S. Appl. No. 13/422,903, dated Sep. 23, 2014.
Ghanea-Hercock, Robert, "Phobos: An agent based user authentication system", May 2003, IEEE, vol. 18, pp. 67-73.

* cited by examiner

OFFLINE AUTHENTICATION

CROSS-REFERENCE TO RELATED APPLICATIONS

This application is a Continuation of U.S. patent application Ser. No. 13/422,903, filed on Mar. 16, 2012, now U.S. Pat. No. 8,955,086 the entire contents of which are hereby incorporated by reference herein.

TECHNICAL FIELD

Embodiments of the present invention relate to managing a computing system, and more specifically, to authentication and/or access for/to a computing system.

BACKGROUND

Computing systems such as desktop computers, laptop computers, tablets, netbooks, and servers, are now commonly used by various people and organizations. For example, students may use laptops when they attend classes on a school campus and employees may use desktops, laptops, tablets and servers when working at corporate/company locations. Computing systems may often be mobile computing systems, such as laptops, netbooks, smart phones, and personal digital assistants (PDAs). These mobile computing systems allow users to perform tasks at different locations (e.g., at home or at a coffee shop, rather than at a corporate office), due to the mobility of the mobile computing systems. Mobile computing systems also provide users with convenient access to a computing system, when the user is not able to access a desktop computer or server. Many users use mobile computing systems because of the convenience and portability of the mobile computing systems.

As the prevalence of computing systems grows, authentication of users and system security on the computing systems is an important concern. Many computing systems use a username/password combination to allow a user access to the computing system (e.g., log into the computing system). If a non-authorized person obtains a user's username/password, then the non-authorized person will be able to obtain all of the privileges and the type of access the user had to the computing system. In addition, if a non-authorized person is able to gain access to the computing system after a user has been given access to the computing system (e.g., after the user has logged in), then the non-authorized person will also have all of the privileges and the type of access the user had to the computing system.

After gaining the privileges/access of the user, a non-authorized person may attempt to change the settings on the computing system, access network resources, and/or attempt to access sensitive data (e.g., a user's files on a local hard drive) on the computing system. For example, the non-authorized person may change network settings on the computing system to redirect network traffic to a different server. In another example, the non-authorized person may attempt to access company confidential files that a user may have stored on the computing system. In yet another example, the non-authorized person may attempt to install malicious programs such as spyware, malware, viruses, trojans, keyloggers, and/or worms on the user's computing system. In a further example, the non-authorized person may be able connect to the network resources after gaining the privileges/access of the user. The non-authorized person might gain access to the network resources such as shared files, documents, emails, network drives, websites, and/or network services, by impersonating the user (e.g., by using a user's username and/or password).

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

A method and system for authentication on a computing system are described. The computing system may be a computing device (e.g., a computer, a laptop computer, a personal digital assistant (PDA)) or a virtual machine (VM). An authentication tool may operate on the computing system to assign a user different roles or contexts (e.g., a Security-Enhanced Linux (SELinux) context or role) for performing operations on the computing system. These roles may allow a user different types of access and/or permissions to the computer system and may allow different operations to be performed on the computing system. The authentication tool may assign these roles based on whether the computing system is connected to a network (e.g., whether the computing system is able to communicate with an authentication server), whether a set of credentials is valid, and/or whether one set of credentials is a subset of another set of credentials.

In one embodiment, if the computing system is connected to a network the computing system may request a first set of credentials (e.g., username/password and a one-time password (OTP)). After authenticating the first set of credentials, the authentication tool may assign a user a first role (e.g., grant the user a first type of access to the computing system). In another embodiment, if the computing system is not connected to the network the computing system may request another set of credentials (e.g., a username/password or a fingerprint). After authenticating the other set of credentials, the authentication tool may assign the user another role (e.g., grant the user another type of access to the computing system). In one embodiment, the other role may allow fewer operations and/or less access to the computing system than the first role (e.g., the other type of access may be less privileged or lower than the first type of access).

In another embodiment, the authentication tool may also determine the type of a user credential provided by the user. The authentication tool may provide the user with a third type of access based on whether the user credential is valid, whether the computing system is connected to a network, and whether the type of the user credential is an approved type. In one embodiment, the authentication tool may grant the user a third type of access to the computing system if the computing system is not connected to the network, the type of the user credential is an approved type, and the user credential is valid.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
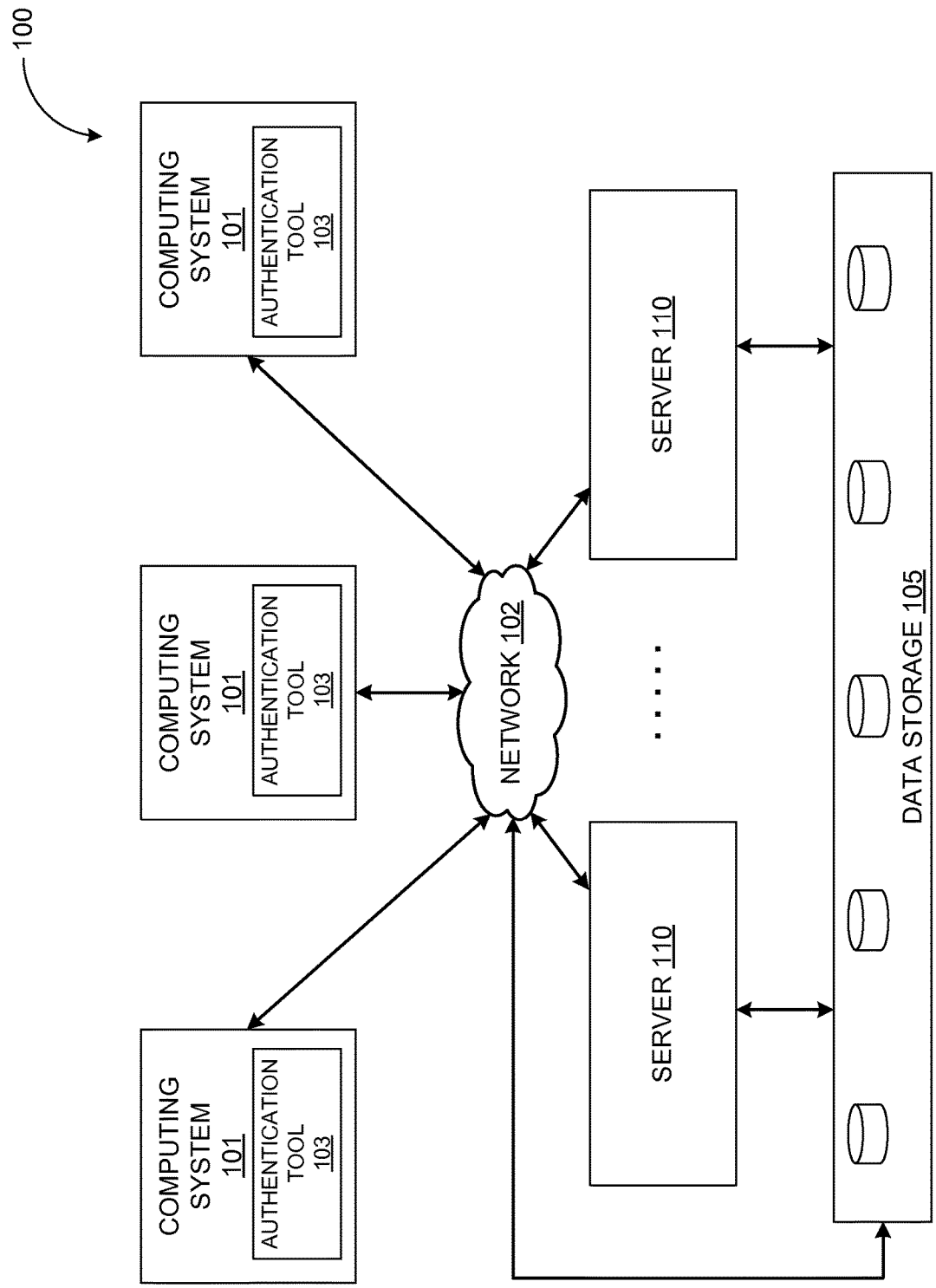
FIG. 1 is a block diagram of an exemplary system architecture in which embodiments of the invention may operate.

FIG. 1 illustrates an exemplary system architecture 100 in which embodiments of the present invention may operate. The system architecture 100 includes servers 110 coupled to computing systems 101 over a network 102. The servers 110 may be a personal computer (PC), a server computer, a personal digital assistant (PDA), a smart phone, a laptop computer, or any machine capable of executing a set of instructions (sequential or otherwise) that specify actions to be taken by that machine. In one embodiment, the servers 110 may be authentication servers which may authenticate user credentials (e.g., a username, password, an OTP, a biometric credential, etc.) An authentication server may also provide an access ticket (e.g., a Kerberos Ticket Granting Ticket (TGT))/cookie to a client (e.g., computing system 101) after authentication of the user password and/or an OTP. The access ticket (e.g., a TGT)/cookie may be used to access network locations, network resources, and/or network services. The access ticket may also be used to assign a user a role for performing operations on the computing system. In another embodiment, the authentication server may be part of a Single Sign-On (SSO) system. In an SSO system, a user is generally authenticated by the authentication server and the authentication server grants access (e.g., via a TGT/cookie) to multiple devices, network resources, network locations, and/or network services, which use the SSO system for authentication. The network 102 may be a private network (e.g., a local area network (LAN), a wide area network (WAN), intranet, etc.), a corporate network (e.g., a private network for an organization such as a corporation), and/or a public network (e.g., the Internet). The servers 110 are also coupled to data storage 105. The data storage 105 includes one or more mass storage devices (e.g., disks), which form a storage pool shared by all of the servers 110 and/or the computing systems 101. In one embodiment, the servers 110 may communicate with each other and may replicate data on each other (e.g., one server 110 may replicate its data on another server 110). Each server 110 may act as a master server (because the data is replicated on each server) and may participate in master-master replication (MMR).

The computing systems 101 may include computing devices that have a wide range of processing capabilities such as PCs, PDAs, smart phones, laptop computers, tablets, netbooks, etc. The computing systems 101 may access the servers 110 and/or data storage 105 over the network 102. In one embodiment, the computing systems 101 may be mobile computing systems including but not limited to, laptops, smart phones, PDAs, tablet computers, netbook computers, etc.

In one embodiment, in order to enhance the security of computing systems 101, the computing systems 101 may use multi-factor authentication. A multi-factor authentication may use a combination of three authentication factors: 1) something the user knows (e.g., the user's password); 2) something the user has (e.g., a security token or smart card); and 3) something the user is (e.g., a biometric factor such as a fingerprint, retinal scan, etc.). In some embodiments, the computing systems may use any combination of the above three factors to authenticate users.

In one embodiment, the computing systems 101 may be disconnected from the network 102 (e.g., offline and/or unable to communicate with an authentication server on the network 102). For example, a computing system 101 (e.g., a laptop computer) may be connected to the network 102 (e.g., a corporate network or a network) during working hours when an employee is located at a specific location (e.g., a corporate office). When the employee leaves the location and takes the computing system 101, the computing system 101 may no longer be connected to the network 102 (e.g., may no longer be able to communicate with an authentication server).

Each computing system 101 includes an authentication tool 103. In one embodiment, the authentication tool 103 may authenticate user credentials and determine whether the computing system 101 is in communication with the network 102. If the computing system 101 is in communication with the network 102, the authentication tool 103 may request a first set of credentials (e.g., perform a two-factor authentication using a username/password and an OTP) and may grant a user a higher type of access (e.g., more privileged access) to the computing system 101. If the computing system is not in communication with the network 102, the authentication tool 103 may request another set of credentials (e.g., a single-factor authentication which includes a username/password) and may grant the user a lower type of access (e.g., less privileged access) to the computing system. In one embodiment, the other set of credentials may be a subset of the first set of credentials. For example, the first set of credentials may include a username/password, a finger print, and an OTP, and the other set of credentials may include a username/pas sword or a finger print. The authentication tool 103 is discussed in further detail below in conjunction with FIGS. 2 and 3.

Figure 2:
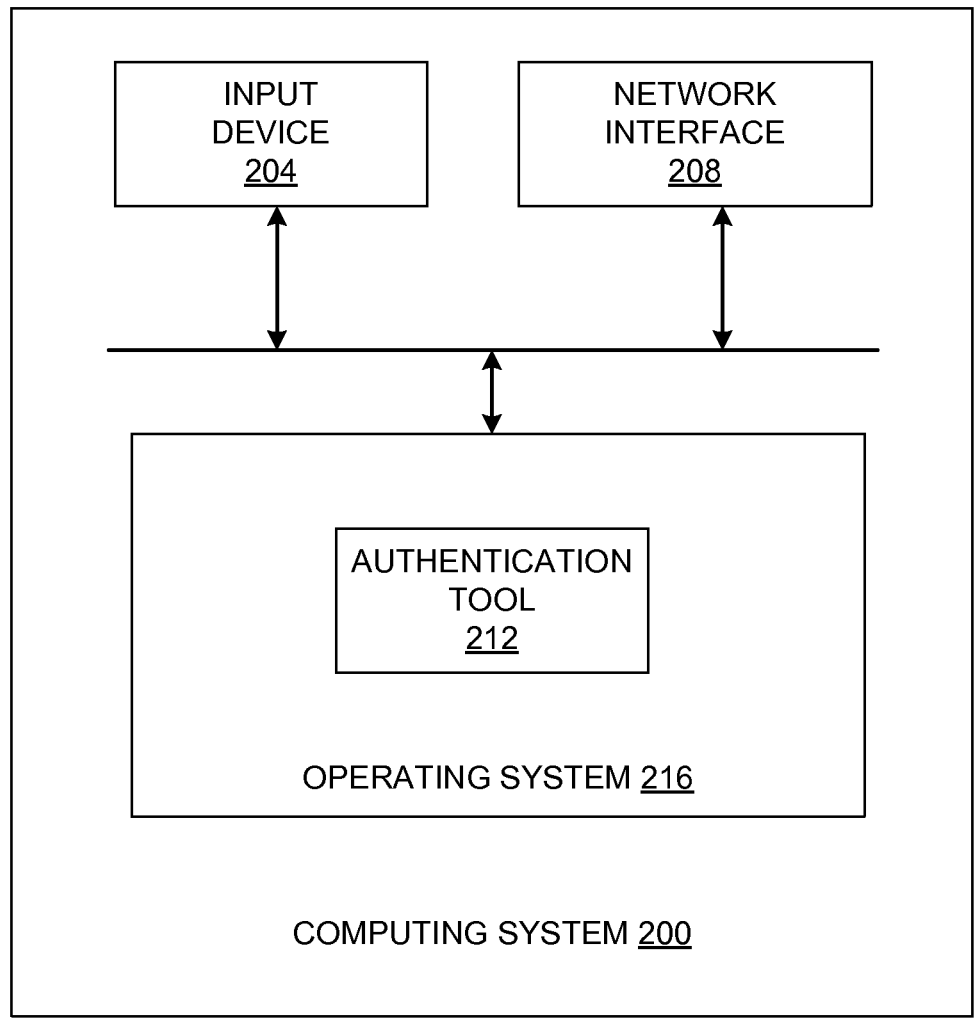
FIG. 2 is a block diagram of an exemplary computing system in which embodiments of the invention may operate.

FIG. 2 is a block diagram of an exemplary computing system 200 in which embodiments of the invention may operate. The computing system 200 may be a personal computer (PC), a server computer, a personal digital assistant (PDA), a smart phone, a laptop computer, a netbook computer, a tablet device, and/or any machine capable of executing a set of instructions (sequential or otherwise) that specify actions to be taken by that machine. The computing system 200 includes an input device 204, a network interface 208, an operating system 216, and an authentication tool 212.

In one embodiment, the input device 204 may include hardware, software, and/or a combination of both. For example, the input device 204 may include, but is not limited to, one or more of a keyboard, a mouse, a touch pad, a touch screen, a biometric input device (e.g., a finger print scanner, an eye scanner, a voice analyzer, etc.), a card reader (e.g., a smart card reader), a security token (e.g., a token which generates OTPs) and/or software and drivers associated with the input device 204. In another embodiment, the input device 204 may be used to accept user input (e.g., accept user credentials). For example, the user may use a keyboard and a mouse to enter a username and/or password. In another example, the user may also provide a finger print scan using a finger print scanner or provide a security card using a card reader. In a further example, the user may also provide an OTP via a keyboard or via a security token.

In one embodiment, the network interface 208 may be used by the computing system 200 to communicate with the network 102, the servers 110, and/or the data storage 105. For example, the computing system 200 may access data and applications located on the servers 101 and/or data storage 105 using the network interface 208. The network interface 208 may be hardware, software, or a combination of both. For example, the network interface 208 may include, but is not limited to, a network interface card (NIC), a wireless network card, physical cables, and/or software and drivers associated with the network interface 208.

In one embodiment, the operating system 216 may be an operating system which uses mandatory access control mechanisms. Mandatory access control mechanisms may provide a requestor (e.g., a process, an application and/or a user) with the minimum amount of privileges required to complete a task. For example, a requestor (e.g., a user, an application, a process, and/or a thread) using and/or operating in the operating system 216 may attempt to perform an operation on an object (e.g., a file, a directory, a communication port, a memory location, etc.) which the operating system 216 has access to. The operating system 216 may provide the requestor with the least amount of access/privileges possible to perform the operation. In another embodiment, the mandatory access control mechanisms may prevent requestors from performing unauthorized operations on objects and/or gaining unauthorized access to objects. For example, the mandatory access control mechanism may prevent a process from overwriting data in another process's memory location. In another example, the mandatory access control mechanisms may prevent a user from installing an unauthorized program or accessing system settings or files.

In another embodiment, requestors (e.g., users, processes, etc.) and objects (e.g., files, directors, memory locations, etc.) may each have one or more security attributes. When a requestor attempts to access and/or operate on an object, the mandatory access control mechanisms of the operating system 216 may examine the security attributes of the requestor and the object the requestor is attempting to access. The mandatory access control mechanisms may also examine one or more user roles or contexts to determine whether the requestor is allowed to access the object and allow/deny a requestor access to an object based on the role or context. For example, an "administrator role" may provide a user with full or partial access to a computing system, while a "guest role" may only provide a user with less privileged access to files and settings of a computing system. In another embodiment, the operations which may be controlled by the mandatory access control mechanisms and the contexts/roles may include, but are not limited to accessing files and directories, accessing hardware, accessing ports, accessing objects, accessing memory and memory locations, installing applications, and executing applications, processes, and/or threads.

In one embodiment, the mandatory access control mechanisms may be part of the operating system 216 (e.g., part of the kernel of the operating system 216). In another embodiment, the mandatory access control mechanisms may include one or more software modules and/or applications which work in conjunction with the operating system 216 to allow/deny requestors access to objects. Examples of operating systems which may use mandatory access control mechanisms include, but are not limited to, SELinux, Windows 7®, Windows Vista®, Mac OS®, FreeBSD®, and Trusted Solaris®.

In one embodiment, the operating system 216 may include an authentication tool 212. The authentication tool 212 may monitor a network connection status of the computing system 200. For example, the authentication tool 212 may monitor whether the computing system 200 is in communication with the network 102 (e.g., a corporate network or a network). In another embodiment, the authentication tool 212 may determine whether the computing system 200 is in communication with the network 102 by determining whether the computing system 200 can communicate with device in the network 102. For example, the computing system 200 may attempt to communicate with a server 110 (e.g., an authentication server). If the computing system 200 can communicate with the server 110, then authentication tool 212 may determine that the computing system 200 is connected to the network 102. In a further embodiment, the authentication tool 212 may operate in conjunction with mandatory access control mechanisms of the operating system 216 to allow/deny requestors (e.g., users, processes, etc.) access to objects (e.g., files, memory locations, etc.) based on one or more roles or contexts.

In one embodiment, each role or context may be associated with different combinations of user identifications, host identifications, and/or network connection statuses. For example, a role or context may be associated with the user identification "Abc1," the host identification "TestLaptop1" (e.g., an identification for the computer system 200), and the network connection status "Disconnected" (e.g., the network status indicating the computing system 200 is not connected to the network 102). In another example, a different role or context may be associated with the user identification "User 201," the host identification "TestLaptop1" (e.g., an identification for the computing system 200), and the network connection status "Connected" (e.g., the network status indicating the computing system 200 is connected to the network 102). In one embodiment, the operating system 216 may grant the user different types of access to the computing system 200 (e.g., allow one or more operations to objects such as files, memory locations) based on the role or context assigned to the user.

Continuing from the above example, the user "Abc1" may be using a computing system 200 with the host identification "TestLaptop1" and the computing system 200 may be connected to the network 201. Based on the network connection status, the computing system 200 may request a first set of user credentials from the user (e.g., a username/password and an OTP) and may authenticate the first set of user credentials. Based on the role or context associated with "Abc1," "TestLaptop1," and the connection status "Connected," the user may be assigned a first role or context which grants full access (e.g., a first type of access) to all objects within the computing system 200. With the first type of access, the user "Abc1" may be able to modify objects such as files, directories, system settings, application settings, ports, software, and/or hardware of the computing system 200. In another example, a user with the user identification "Abc1" may be using a computing system 200 with the host identification "TestLaptop1" and the computing system 200 may not be connected to the network 201. Based on the network connection status of "Disconnected," the computing system 200 may request another set of user credentials from the user (e.g., a username/password).

Referring to the previous example, an OTP may not be requested, because the computing system 200 is not connected to the network 201 and may be unable to authenticate the OTP. Based on the context or role associated with "Abc1," "TestLaptop1,", and the connection status "Disconnected," the user "Abc1" may be granted less privileged access (e.g., a second type of access) to all objects within the computing system 200. With the second type of access, the user "Abc1" may be able to read but not modify objects such as files, directories, system settings, application settings, ports, software, and/or hardware of the computing system 200.

It should be understood that the one or more roles or contexts may allow for more granular types of access to objects of the computing system 200. For example, a role or context may allow a user full access to personal files on the computing system 200, but may allow less privileged access to system files on the computing system 200. In one embodiment, a role or context may specify a type of access for each individual object on the computing system 200 (e.g., each file, directory, memory location, etc.). In another embodiment, a role or context may specify a type of access to some of the objects on the computing system 200. In one embodiment, the authentication tool 212 may also provide a ticket (e.g., a TGT) or a cookie to a user, to provide the user with access to network resources and/or locations.

Although the authentication tool 212 is shown as part of the operating system 216 in FIG. 2, in another embodiment, the authentication tool 212 may be separate from the operating system 216. For example, the authentication tool 212 may be an application/process executing in conjunction with the operating system 216. In another example, the authentication tool 212 may include a hardware component, a software component, or a combination of both, on the computing system 200.

Figure 3:
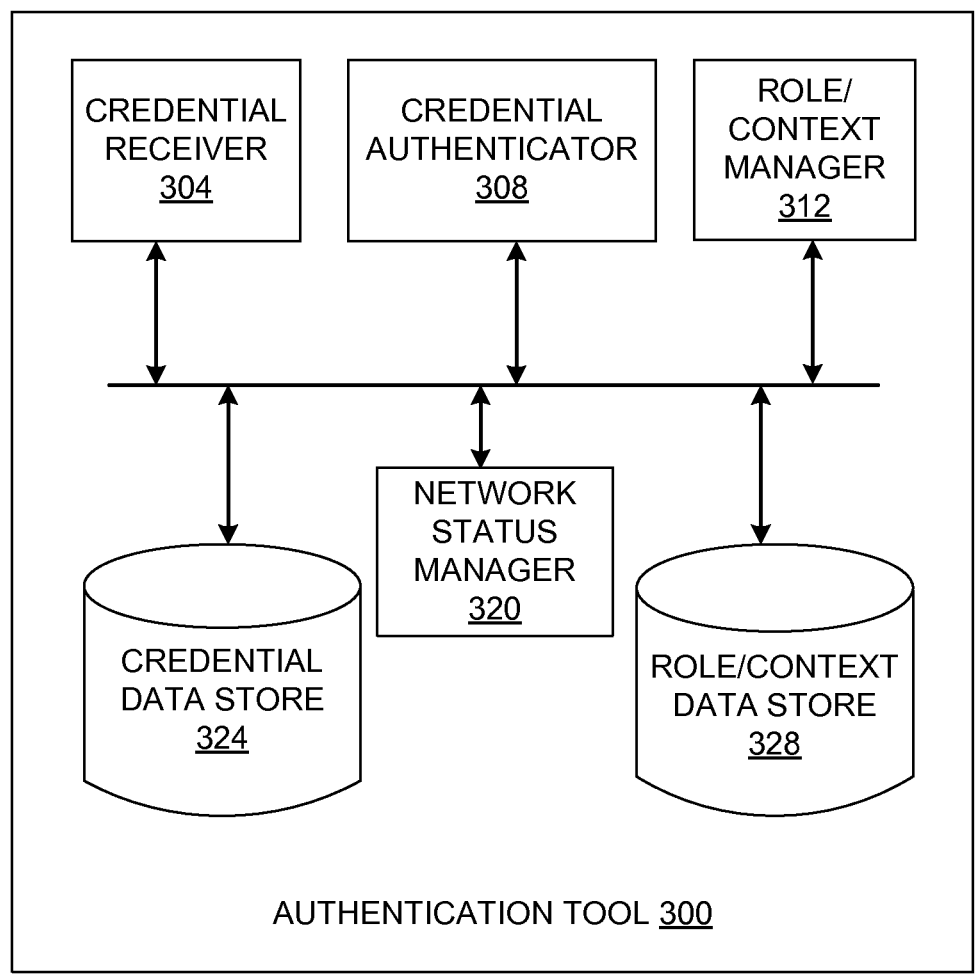
FIG. 3 is a block diagram illustrating an authentication tool according to one embodiment.

FIG. 3 is a block diagram illustrating an authentication tool 300 according to one embodiment. The authentication tool 300 may include a credential receiver 304, a credential authenticator 308, a role/context manager 312, a network status manager 320, a credential data store 324, and a role/context data store 328. More or less components may be included in the authentication tool 300 without loss of generality.

In one embodiment, the network status manager 320 may monitor the connection status of the computing system 200. The network status manager 320 may use the network interface 208 when determining the network connection status of the computing system 200. For example, the network status manager 320 may determine whether the computing system 200 is connected to the network 102 via the network interface 208. In another embodiment, based on the network status, the authentication tool 300 may prompt and/or request different sets and/or types of user credentials from a user based on the network status (e.g., whether the computing system is connected to the network). For example, if the computing system 200 is not connected to the network 102 (e.g., is offline and/or cannot communicate with an authentication server), the authentication tool 300 may request only a username/password. In another example, if the computing system is connected to the network 102 (e.g., can communicate with the authentication server), the authentication tool 300 may request a username/password and an OTP.

In one embodiment, the credential receiver 304 may receive one or more user credentials from a user. In another embodiment, the credential receiver 304 may operate in conjunction with the input device 204 to receive the one or more user credentials. For example, the user may provide a user identification (e.g., a username) and password using a keyboard. The credential receiver 304 may receive the username and password from the keyboard. In another example, the user may provide a finger print using a finger print scanner. The credential receiver 304 may receive the finger print from the finger print scanner. In one embodiment, the credential receiver 304 may receive a plurality of user credentials from the user. For example, the credential receiver 304 may receive a username, password, a fingerprint, and an OTP from the user.

In one embodiment, the credential authenticator 308 may authenticate the user credential received from the user. For example, the credential authenticator 308 may determine whether a username and password combination is valid. In another example, the credential authenticator 308 may analyze a finger print to determine if the finger print is valid. In another embodiment, the credential data store 324 may store data related to one or more user credentials. For example, the credential data store may store valid username and password combinations. In another example, the credential data store may store finger print data. In one embodiment, credential authenticator 308 may access data within the credential data store 324 when a user credential is received from the user. For example, the credential authenticator 308 may receive a username and password from the user. The credential authenticator 308 may access the credential data store 324 to determine whether the username and password are valid. Although the credential data store 324 is shown as part of the authentication tool 300, in other embodiments, the credential data store 324 may reside in a different location. For example, the credential data store 324 may be stored in a memory and/or a hard drive in the computing system 200. If multiple user credentials are provided by the user, the credential authenticator 308 may authenticate one or more of the multiple user credentials.

In one embodiment, the credential authenticator 308 may also determine the type of the user credential. For example, the credential authenticator 308 may determine that a user credential is a username/password combination. In another example, the credential authenticator 308 may determine that the user credential is a biometric credential, or a smart card credential, and/or an OTP credential. In one embodiment, the authentication tool 330 may allow a user to specify the types of credentials the user will provide.

In one embodiment, the role/context manager 312 may grant and/or deny a requestor (e.g., a user, a process, etc.) access to one or more objects (e.g., a file, a memory location, etc.) based on the network connection status by assigning a role or context to a user. For example, the role/context manager 312 may assign the user a role or context which allows the user less privileged access to a file on the computing system 200. In another example, the role/context manager 312 may assign the user a role or context which allows the user full access to a file. In yet another example, the role/context manager 312 may assign the user a role or context which blocks the user from all access to a file.

In another embodiment, the role/context manager 312 assign the user a role or context based on one or more of the validation of a user credential, a host identification of the computing system 200, the network connection status, and the type of the user credential. For example, a role or context (e.g., a guest role) may provide the user "Abc1" with full access to personal files, and partial access to system files and system settings, if the network connection status is "Disconnected" and the user was authenticated using a username/password only. In another example, a different role or context (e.g., an administrator role) may provide the user "Abc1" with full access to all objects (e.g., files, memory locations, settings, etc.) if the network connection status is "Connected" and the user was authenticated using a username/password and an OTP.

In one embodiment, a list of permissions and/or types of access allowed by a role or context may be stored in the role/context data store 328 (e.g., stored as a security policy). The role/context manager 312 may access the list of permissions and/or may access the role/context data store 328 in order to determine if a requestor should be allowed access to an object or should be allowed to perform an action. Although the role/context data store 328 is shown as part of the authentication tool 300, in other embodiments, the role/context data store 328 may reside in a different location. For example, the role/context data store 328 may be stored in a memory and/or a hard drive in the computing system 200.

Figure 4:
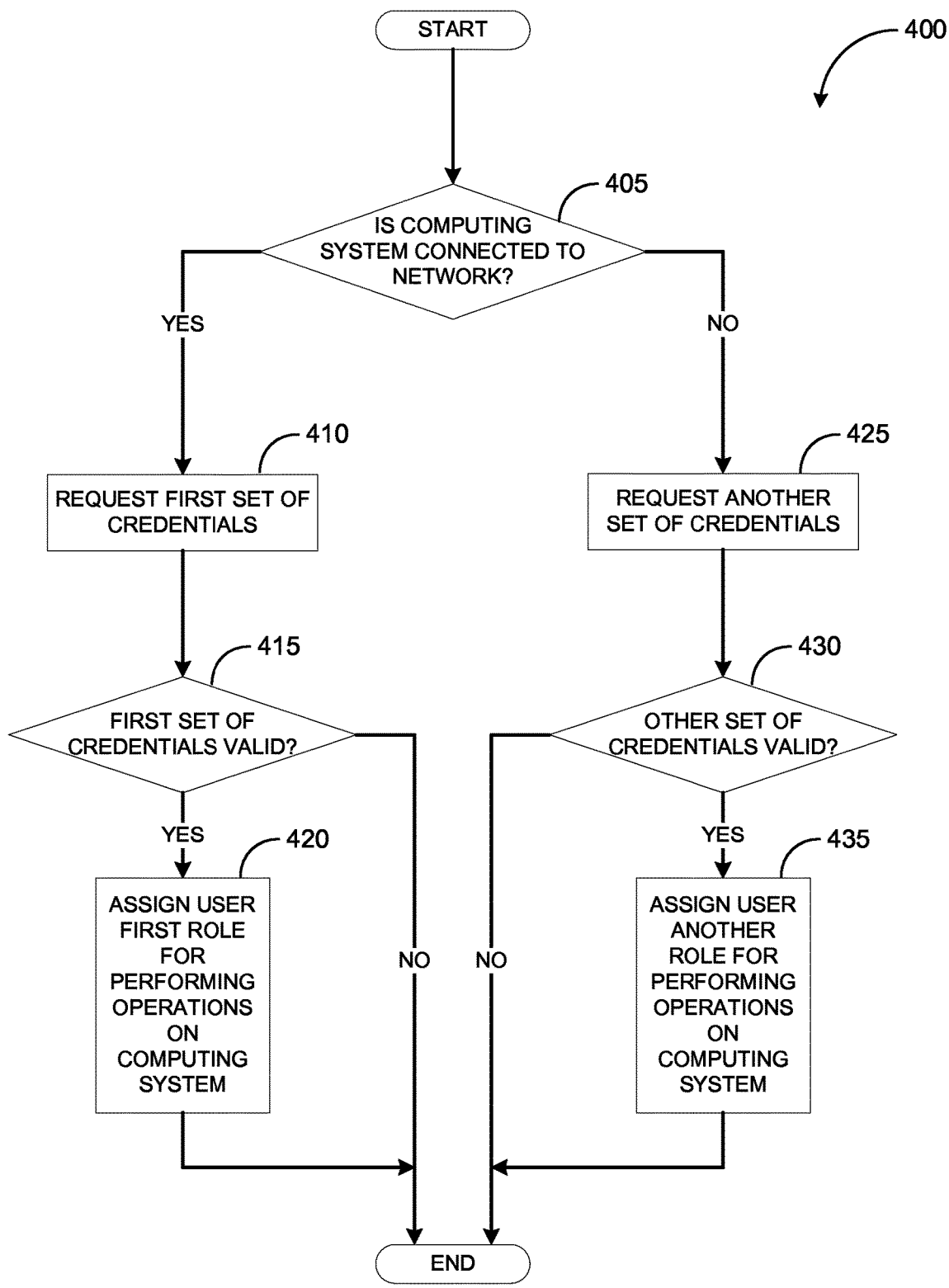
FIG. 4 is a flow diagram illustrating a method for assigning a user a context or role for performing operations on a computing system, in accordance with one embodiment.

FIG. 4 is a flow diagram illustrating a method 400 for assigning a user a context or role for performing operations on a computing system, in accordance with one embodiment. The method 400 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 400 is performed by a computing system (e.g., the computing system 200 of FIG. 2).

Referring to FIG. 4, the method 400 starts with the computing system determining whether the computing system is connected to a network (block 405). For example, the computing system may determine whether the computing system is able to communicate with an authentication server. At block 410, if the computing system is connected to a network (e.g., able to communicate with the authentication server), the computing system may request a first set of credentials from the user. For example, the computing system may request a username/password, a finger print, and an OTP. The computing system determines whether the first set of credentials is valid at block 415. For example, the computing system may authenticate a username/password combination, authenticate an OTP with the authentication server, and/or authenticate a finger print. If the first set of credentials is not valid (e.g., at least one credential in the first set of credentials is not valid), the method 400 ends. In one embodiment, if one or more credentials in the first set of credentials is not valid (e.g., cannot be authenticated) the computing system may re-request the one or more credentials from the user. If the first set of credentials is valid (e.g., all the credentials in the first set of credentials are valid), the computing system grants the user access to the computing system and assigns the user a first role for performing operations on the computing system (block 420). As discussed above, the first role may allow a user a certain type of access (e.g., allow certain operations) and/or permissions to the computing system. For example, the first role may allow a user full permissions (e.g., read/write permissions) to objects, hardware, software, settings, files, network resources, network locations, etc., of the computing system.

Referring to block 405, if the computing system is not connected to the network (e.g., is offline and/or unable to communicate with authentication server), the computing system requests another set of credentials at block 425. For example, the computing system may request a username/password and/or a finger print. The computing system determines whether the other set of credentials is valid at block 430. If the other set of user credentials is not valid, the method 400 ends. In one embodiment, if one or more credentials in the other set of credentials is not valid (e.g., cannot be authenticated) the computing system may re-request the one or more credentials from the user. If the other set of credentials is valid, the computing system grants the user access to the computing system and assigns the user another role for performing operations on the computing system (block 435). In one embodiment, the other role may allow a user a different type of access (e.g., allow certain operations) and/or permissions to the computing system, as compared to the first role discussed above. For example, the other role may allow a user less privileged permissions to objects, hardware, software, settings, files, etc., of the computing system. In another embodiment, the other role may allow fewer operations and/or permissions to the computing system, as compared to the first role.

Figure 5:
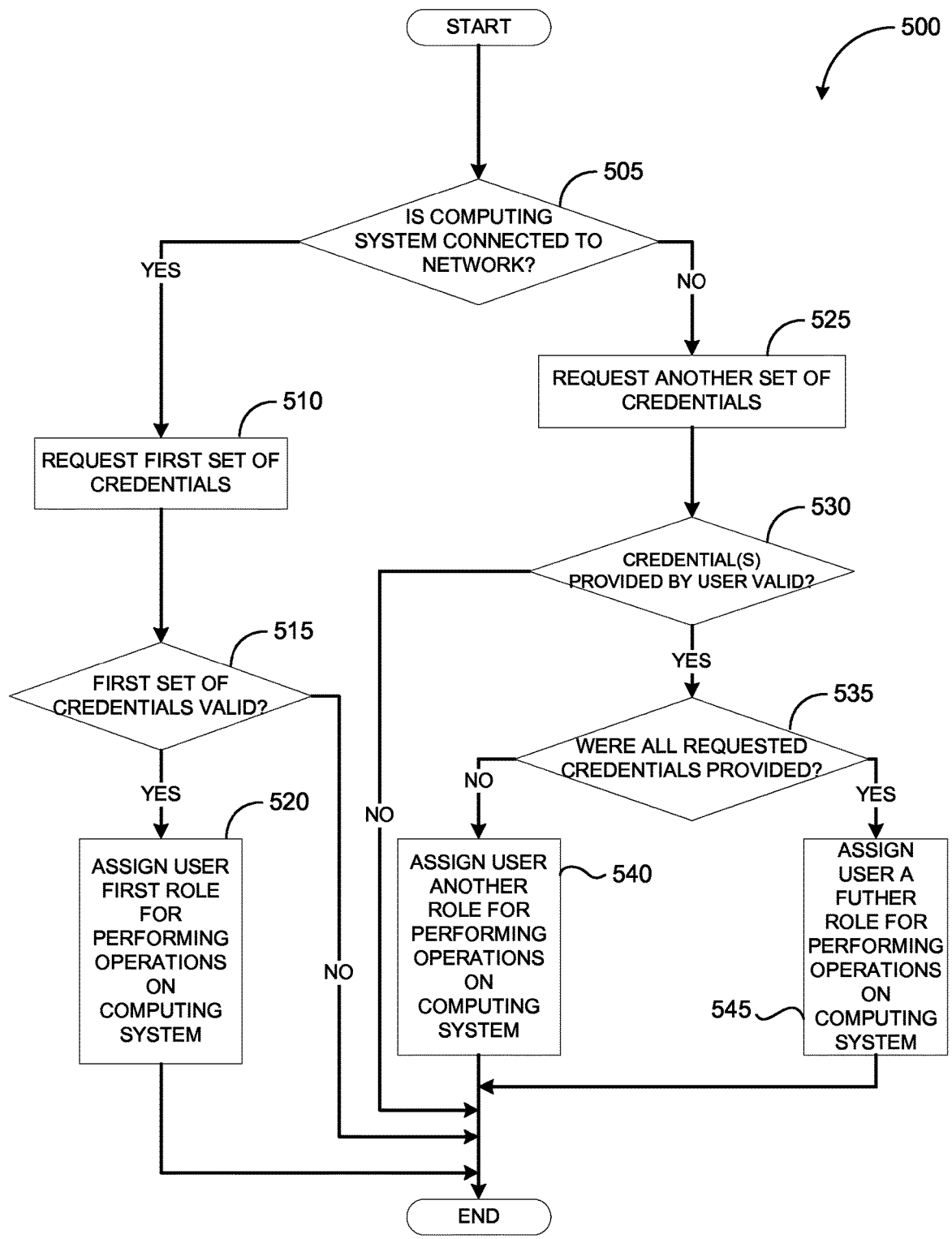
FIG. 5 is a flow diagram illustrating a method for assigning a user a context or role for performing operations on a computing system, in accordance with another embodiment.

FIG. 5 is a flow diagram illustrating a method 500 for assigning a user a context or role for performing operations on a computing system, in accordance with another embodiment. The method 500 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 500 is performed by a computing system (e.g., the computing system 200 of FIG. 2).

Referring to FIG. 5, the method 500 starts with the computing system determining whether the computing system is connected to a network (block 505). At block 510, if the computing system is connected to a network (e.g., able to communicate with the authentication server), the computing system requests a first set of credentials from the user. For example, the computing system may request a username/password, a finger print, and an OTP. The computing system determines whether the first set of credentials is valid at block 515. If the first set of credentials is valid, the computing system grants the user access to the computing system and assigns the user a first role for performing operations on the computing system (block 520). As discussed above, the one role may allow a user a certain type of access (e.g., allow certain operations) and/or permissions to the computing system. If the first set of user credentials is not valid, the method 500 ends. In one embodiment, if one or more credentials in the first set of credentials is not valid (e.g., cannot be authenticated) the computing system may re-request the one or more credentials from the user.

Referring to block 505, if the computing system is not connected to the network (e.g., is offline and/or unable to communicate with authentication server), the computing system requests another set of credentials at block 525. For example, the computing system may request a username/password and/or a finger print. The user may provide one or more credentials and the computing system may determine whether the one or more credentials provided by the user are valid at block 530. If the one or more credentials are not valid, the method 500 ends. In one embodiment, if one or more credentials in the other set of credentials is not valid (e.g., cannot be authenticated) the computing system may re-request the one or more credentials from the user.

If the one or more credentials are valid, the computing system determines whether all of the requested credentials (e.g., all of the credentials in the other set of credentials requested at block 525) were provided at block 535. Referring back to block 525, although the other set of credentials is requested, the user may provide fewer credentials than requested. For example, if a username/password and a finger print are requested, the user may provide only a username/ password or only a finger print. If the user did not provide all of the requested credentials (e.g., user did not provide all of the credentials in the other set of credentials, requested at block 525), the computing system grants the user access to the computing system and assigns the user another role for performing operations on the computing system (block 540). In one embodiment, the other role may allow a user a different type of access and/or permissions (e.g., a lower type of access or fewer operations) to the computing system, as compared to the first role discussed above.

If the user did provide all of the requested credentials (e.g., user did provide all of the credentials in the other set of credentials, requested at block 525), the computing system assigns the user a further role for performing operations on the computing system at block 545. In one embodiment, the further role may allow a user a different type of access (e.g., allow certain operations) and/or permissions to the computing system, as compared to the first role and the other role discussed above. For example, the further role may allow a higher type of access/permissions (e.g., allow more operations to be performed on the computing system) than the other role but may allow a lower type of access/permissions (e.g., allow fewer operations) than the first role.

Figure 6:
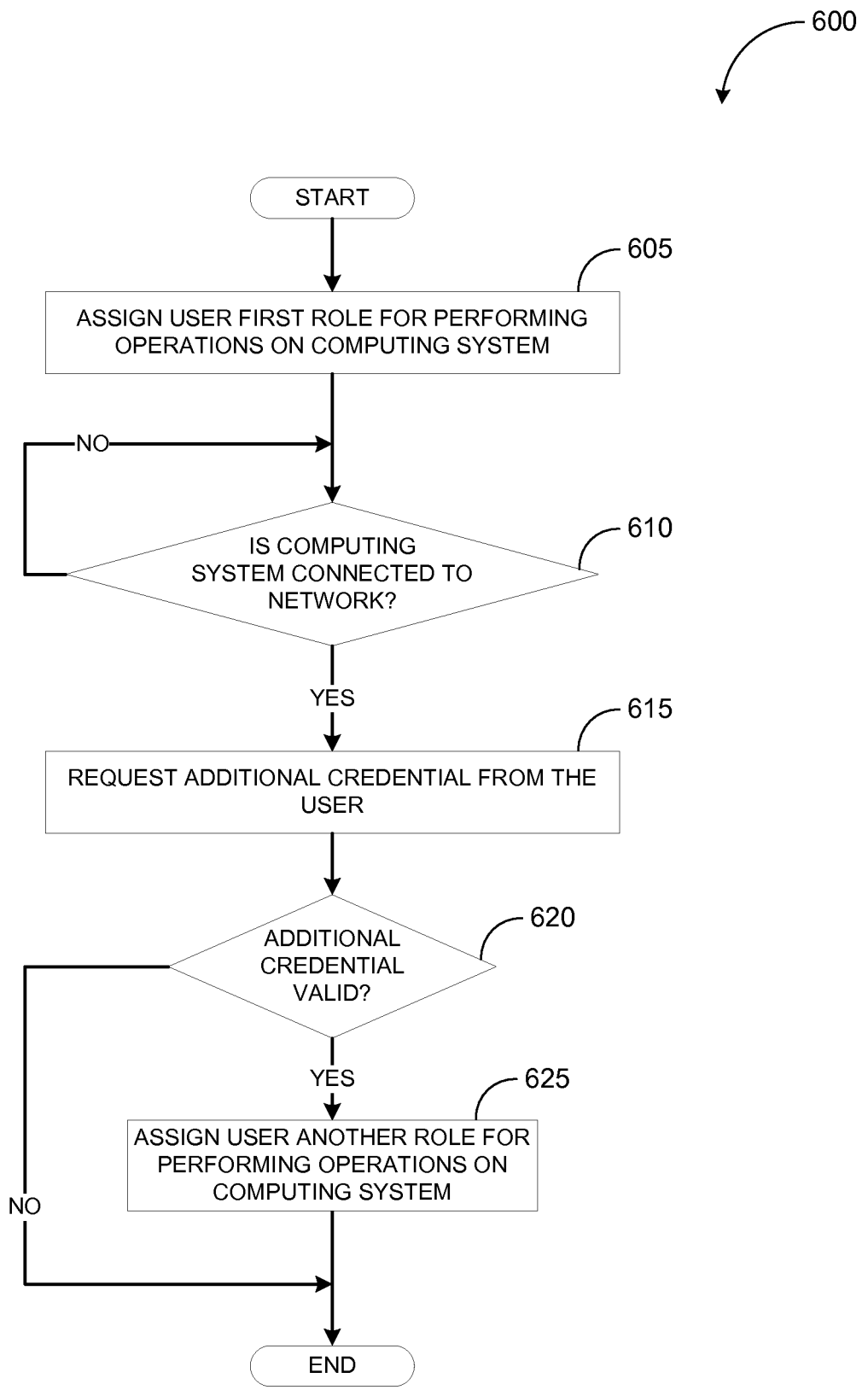
FIG. 6 is a flow diagram illustrating a method for assigning a user a context or role for performing operations on a computing system, in accordance with a further embodiment.

FIG. 6 is a flow diagram illustrating a method for assigning a user a context or role for performing operations on a computing system, in accordance with a further embodiment. The method 600 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 600 is performed by a computing system (e.g., the computing system 200 of FIG. 2).

In one embodiment, the method of 600 may be performed after the method 400 of FIG. 4 and/or the method 500 of FIG. 5 have been performed by the computing system. For example, the method 600 may be performed after block 435 of the method 400 shown in FIG. 4. In another example, the method 600 may be performed after one of blocks 540 or 545 of the method 500 shown in FIG. 5.

Referring to FIG. 6, the method 600 starts with the computing system assigning the user a first role (e.g., block 540) for performing operations on the computing system at block 605. Although not shown in the figure, the computing system may also grant the user a further role for performing operations on the computing system, as discussed above in conjunction with FIG. 5 (e.g., block 545). The user may be assigned the first role for performing operations on the computing system after another set of credentials is authenticated (e.g., block 425 of method 400 in FIG. 4 or blocks 540 and 545 in method 500 of FIG. 5). At block 610, the computing system determines whether the computing system is connected to the network (e.g., determines whether the computing system can communicate with an authentication server). If the computing system is not connected to the network (e.g., cannot communicate with the authentication server), then the method 600 proceeds back to block 610. If the computing system is connected to the network (e.g., the computing system is later able to communicate with the authentication server), the computing system requests an additional credential from the user (block 615).

As discussed above, in one embodiment, a first set of credentials may be a subset of another set of credentials. The additional credential may be a credential which is part of the first set of credentials but not part of the other set of credentials. For example, the first set of credentials may include a username/password and an OTP. The other set of credentials may include a username/password. The additional credential may include the OTP, which is in the first set of credentials, but is not in the other set of credentials. At block 620, the computing system may determine whether the additional credential is valid. If the additional credential is not valid, the method 600 ends. In one embodiment, if the additional credential is not valid, the computing system may re-request the additional credential from the user. If the additional credential is valid, the computing system assigns the user another role for performing operations on the computing system at block 625.

In one embodiment, the other role (assigned to the user in block 625) may allow a user more access to and/or permissions (e.g., allow more operations to be performed on the computing system) than the first role. For example, the other role may allow a user (e.g., a requestor) full access to all objects in the computing system (e.g., files, directories, memory locations, hardware, software, settings, etc.). The first role may allow a user full access to personal files and less privileged access to other objects in the computing system.

Figure 7:
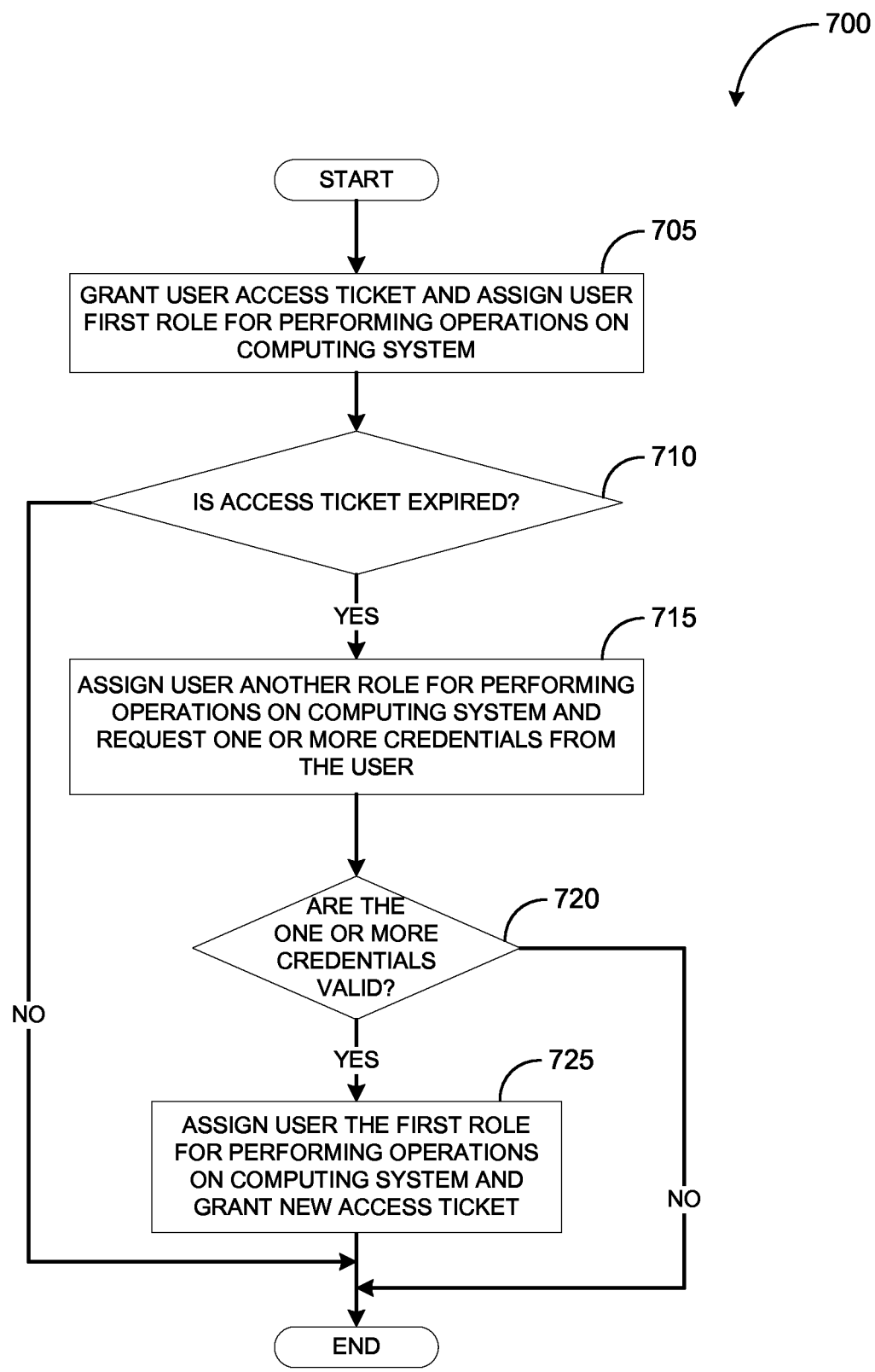
FIG. 7 is a flow diagram illustrating a method for assigning a user a context or role for performing operations on a computing system, in accordance with yet another embodiment.

FIG. 7 is a flow diagram illustrating a method for assigning a user a context or role for performing operations on a computing system, in accordance with yet another embodiment. The method 700 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 700 is performed by a computing system (e.g., the computing system 200 of FIG. 2).

In one embodiment, the method of 700 may be performed after the method 400 of FIG. 4, the method 500 of FIG. 5, and/or the method 600 of FIG. 6 have been performed by the computing system. For example, the method 700 may be performed after block 420 of the method 400 shown in FIG. 4. In another example, the method 700 may be performed after block 620 of the method 500 shown in FIG. 5. In a further example, the method 700 may be performed after block 625 of the method 600 shown in FIG. 6.

Referring to FIG. 7, the method 700 starts with the computing system granting the user an access ticket (or a cookie) and assigning the user a first role for performing operations on the computing system at block 705 based on the access ticket. At block 710, the computing system determines whether the access ticket has expired. For example, an access ticket granted to the user may be valid for a specified period of time (e.g., 1 day, 8 hours, etc.). If the access ticket has not expired, the method 700 ends. If the access ticket has expired, the computing system assigns the user another role for performing operations on the computing system and requests one or more credentials from the user (block 715). In one embodiment, the computing system may request the same set of credentials which was previously requested when the access ticket was granted (e.g., if a password and OTP were requested before, a password and OTP are requested again). In another embodiment, the computing system may request a different set of credentials (e.g., a password and OTP were requested before and only the OTP is requested). At block 720, the computing system may determine whether the one or more credentials are valid. If the one or more credentials are not valid, the method 700 ends. In one embodiment, if the one or more credentials are not valid, the computing system may re-request the one or more credentials from the user. If the one or more credentials are valid, the computing system may grant the user a new access ticket and re-assign the user the first role for performing operations on the computing system based on the new access ticket, at block 725.

Figure 8:
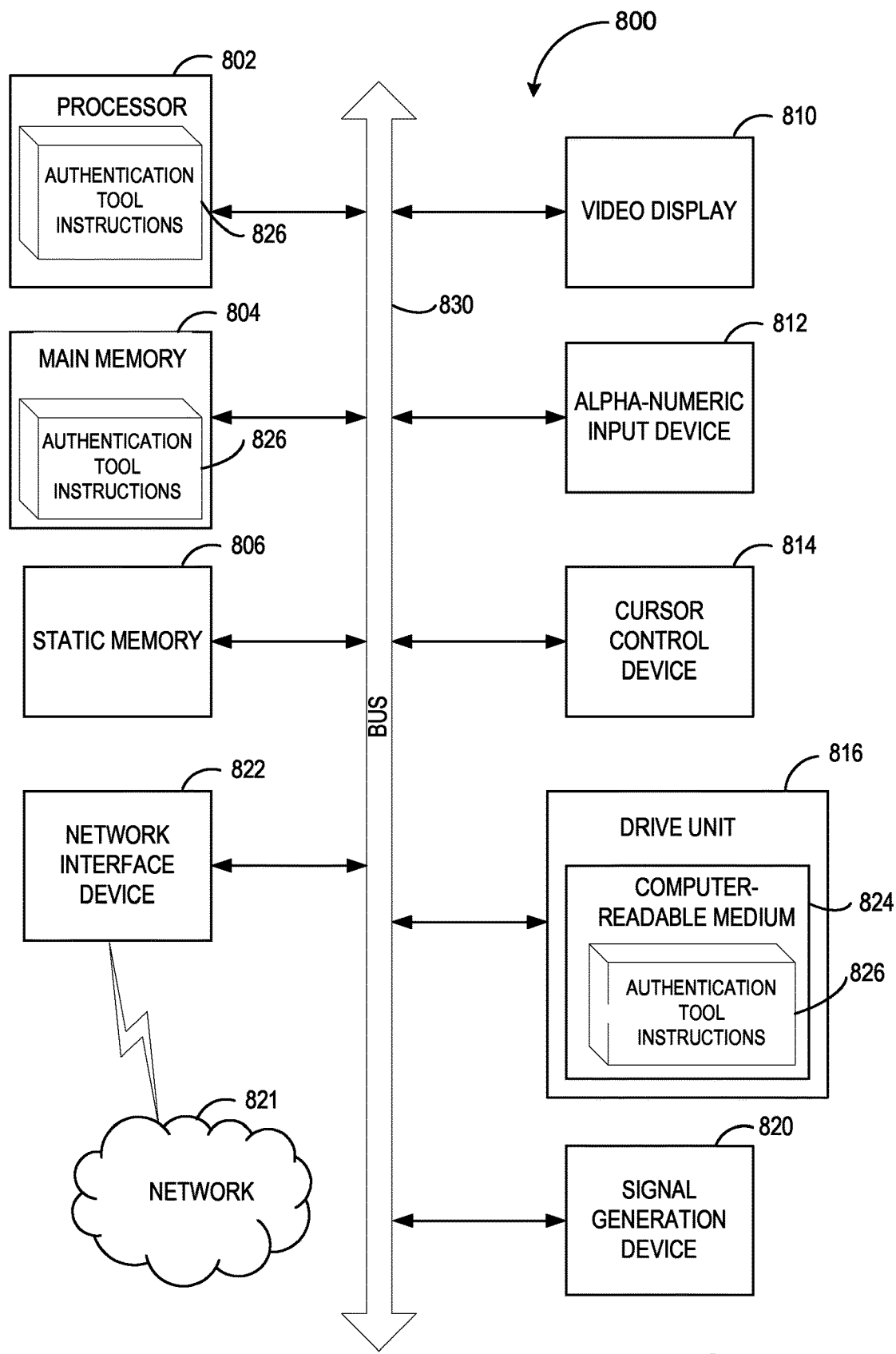
FIG. 8 illustrates a diagrammatic representation of a machine in the exemplary form of a computer system, in accordance with one embodiment.

FIG. 8 illustrates a diagrammatic representation of a machine in the exemplary form of a computer system 800 within which a set of instructions 826, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processor 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a secondary memory 816 (e.g., a data storage device), which communicate with each other via a bus 830.

The processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 802 may also be one or more special-purpose processing devices such as an application specific integrated circuit (ASIC), a field programmable gate array (FPGA), a digital signal processor (DSP), network processor, or the like. The processor 802 is configured to execute authentication tool 300 for performing the operations and steps discussed herein.

The computer system 800 may further include a network interface device 822. The network interface device may be in communication with a network 821. The computer system 800 also may include a video display unit 810 (e.g., a liquid crystal display (LCD), a touch screen, or a cathode ray tube (CRT)), an alphanumeric input device 812 (e.g., a keyboard), a cursor control device 814 (e.g., a mouse), and a signal generation device 820 (e.g., a speaker).

The secondary memory 816 may include a computer-readable storage medium (or more specifically a computer-readable storage medium) 824 on which is stored one or more sets of instructions 826 for authentication tool 300 embodying any one or more of the methodologies or functions described herein. The instructions 826 of the authentication tool 300 may also reside, completely or at least partially, within the main memory 804 and/or within the processing device 802 during execution thereof by the computer system 800, the main memory 804 and the processing device 802 also constituting computer-readable storage media. The instructions 826 of the authentication tool 300 may further be transmitted or received over a network via the network interface device 822.

While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions 826. The term "computer-readable storage medium" shall also be taken to include any medium that is capable of storing or encoding a set of instructions for execution by the machine that cause the machine to perform any one or more of the methodologies of the present invention. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "maintaining," "receiving," "authenticating," "refraining," "identifying," "specifying," "determining," "granting," "accessing," "assigning," "executing," "monitoring," "detecting," "requesting," and "adjusting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   determining, by a hardware processing device, whether a computer system is able to access an authentication server;
   in response to determining that the computer system is able to access the authentication server:
     requesting a first set of credentials;
     authenticating the first set of credentials; and
     assigning a user a first role to perform operations on the computer system in view of the first set of credentials; and
   in response to determining that the computer system is unable to access the authentication server:
     requesting a second set of credentials different from the first set of credentials;
     receiving one or more credentials provided by the user;
     responsive to determining that the one or more credentials comprise an entirety of the second set of credentials, assigning the user a third role for performing operations on the computer system; and
     responsive to determining that the one or more credentials comprise less than the entirety of the second set of credentials, wherein the subset of credentials is part of, but less than a whole of, the second set of credentials:
       authenticating the one or more credentials; and
       assigning the user a second role to perform the operations on the computer system in view of the one or more credentials, wherein the first role specifies a first type of access to at least one object on the computer system, and the second role specifies a second type of access to the at least one object, wherein the first type of access is different from the second type of access, wherein the third role is different from the first role and is different from the second role.

2. The method of claim 1, wherein the second role allows fewer operations to be performed on the computer system than the first role.

3. The method of claim 1, further comprising:
   in response to determining that the computer system is unable to access the authentication server:
     detecting that the computer system is later able to access the authentication server;
     requesting an additional credential, wherein the first set of credentials comprises the additional credential and the second set of credentials does not include the additional credential;
     authenticating the additional credential; and
     assigning the user the first role for access to the computer system in view of the additional credential.

4. The method of claim 1, wherein the second role and the third role allow fewer operations to be performed on the computer system than the first role, and wherein the third role allows more operations to be performed on the computer system than the second role.

5. The method of claim 1, wherein the first role provides access to at least one of network resources or network services.

6. The method of claim 1, further comprising:
   in response to determining that the computer system is able to access the authentication server:
     providing the user an access ticket;
     determining whether the access ticket is expired;
     in response to determining that the access ticket is expired, assigning the user the second role for performing operations on the computer system and requesting one or more additional credentials;
     authenticating the one or more additional credentials; and
     in response to determining that the one or more additional credentials are valid, assigning the user the first role for access to the computer system.

7. An apparatus comprising:
   a hardware processing device to:
     determine whether a computer system is able to access an authentication server;
     in response to determining that the computer system is able to access the authentication server:
       request a first set of credentials;
       authenticate the first set of credentials; and
       assign a user a first role to perform operations on the computer system in view of the first set of credentials; and
     in response to determining that the computer system is unable to access the authentication server:
       request a second set of credentials different from the first set of credentials;
       receive one or more credentials provided by the user;
       responsive to determining that the one or more credentials comprises an entirety of the second set of credentials, assign the user a third role for performing operations on the computer system; and
       responsive to determining that the one or more credentials comprise less than the entirety of the second set of credentials, wherein the subset of credentials is part of, but less than a whole of, the second set of credentials:
         authenticate the one or more credentials; and
         assign the user a second role to perform the operations on the computer system in view of the one or more credentials, wherein the first role specifies a first type of access to at least one object on the computer system, and the second role specifies a second type of access to the at least one object, wherein the first type of access is different from the second type of access, wherein the third role is different from the first role and is different from the second role.

8. The apparatus of claim 7, wherein the second role allows fewer operations to be performed on the computer system than the first role.

9. The apparatus of claim 7, wherein the hardware processing device is further to:
in response to determining that the computer system is unable to access the authentication server:
detect that the computer system is later able to access the authentication server;
request an additional credential, wherein the first set of credentials comprises the additional credential and the second set of credentials does not include the additional credential;
authenticate the additional credential; and
assign the user the first role for access to the computer system in view of the additional credential.

10. The apparatus of claim 7, wherein the second role and the third role allow fewer operations to be performed on the computer system than the first role, and wherein the third role allows more operations to be performed on the computer system than the second role.

11. The apparatus of claim 7, wherein the first role provides access to at least one of network resources or network services.

12. The apparatus of claim 7, wherein the hardware processing device is further to:
in response to determining that the computer system is able to access the authentication server:
provide the user an access ticket;
determine whether the access ticket is expired;
in response to determining that the access ticket is expired, assign the user the second role for performing operations on the computer system and request one or more additional credentials;
authenticate the one or more additional credentials; and
in response to determining that the one or more additional credentials are valid, assign the user the first role for access to the computer system.

13. A non-transitory machine-readable storage medium comprising data that, when accessed by a hardware processing device, cause the hardware processing device to:
determine, by the hardware processing device, whether a computer system is able to access an authentication server;
in response to determining that the computer system is able to access the authentication server:
request a first set of credentials;
authenticate the first set of credentials; and
assign a user a first role to perform operations on the computer system in view of the first set of credentials; and
in response to determining that the computer system is unable to access the authentication server:
request a second set of credentials different from the first set of credentials;
receive one or more credentials provided by the user;
responsive to determining that the one or more credentials comprise an entirety of the second set of credentials, assign the user a third role for performing operations on the computer system; and
responsive to determining that the one or more credentials comprise less than the entirety of the second set of credentials, wherein the subset of credentials is part of, but less than a whole of, the second set of credentials:
authenticate the one or more credentials; and
assign the user a second role to perform the operations on the computer system in view of the one or more credentials, wherein the first role specifies a first type of access to at least one object on the computer system, and the second role specifies a second type of access to the at least one object, wherein the first type of access is different from the second type of access, wherein the third role is different from the first role and is different from the second role.

14. The non-transitory machine-readable storage medium of claim 13, wherein the second role allows fewer operations to be performed on the computer system than the first role.

15. The non-transitory machine-readable storage medium of claim 13, wherein the hardware processing device is further to:
in response to determining that the computer system is unable to access the authentication server:
detect that the computer system is later able to access the authentication server;
request an additional credential, wherein the first set of credentials comprises the additional credential and the second set of credentials does not include the additional credential;
authenticate the additional credential; and
assign the user the first role for access to the computer system in view of the additional credential.

16. The non-transitory machine-readable storage medium of claim 13, wherein the first role provides access to at least one of network resources or network services.

17. The non-transitory machine-readable storage medium of claim 13, wherein the hardware processing device is further to:
in response to determining that the computer system is able to access the authentication server:
provide an access ticket to the user;
determine whether the access ticket is expired;
in response to determining that the access ticket is expired, assign the user the second role for performing operations on the computer system and request one or more additional credentials;
authenticate the one or more additional credentials; and
in response to determining that the one or more additional credentials are valid, assign the user the first role for access to the computer system.

* * * * *